United States Patent
Nakamura

(12) United States Patent (10) Patent No.: US 6,507,133 B1
(45) Date of Patent: Jan. 14, 2003

(54) STATOR ARRANGEMENT OF VEHICLE AC GENERATOR

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/588,612

(22) Filed: Jun. 6, 2000

(30) Foreign Application Priority Data

Jul. 15, 1999 (JP) ............................................ 11-201064

(51) Int. Cl.[7] ............................. H02K 3/12; H02K 3/24
(52) U.S. Cl. ...................... 310/52; 310/58; 310/201; 310/215
(58) Field of Search ................................. 310/180, 201, 310/215, 52, 58, 263

(56) References Cited

U.S. PATENT DOCUMENTS 5,325,003 A * 6/1994 Saval et al. .................. 310/43
5,998,903 A 12/1999 Umeda et al. ............... 310/179
6,018,205 A * 1/2000 Ohashi et al. ................ 310/52

FOREIGN PATENT DOCUMENTS

GB 2 202 170 9/1988 ............ H02K/3/12

* cited by examiner

Primary Examiner—Burton S. Mullins
(74) Attorney, Agent, or Firm—Oliff & Berridge, PLC

(57) ABSTRACT

A vehicle AC generator including a three-phase stator winding, a rotor which has at least 16 claw pole pieces and is rotatable at a speed for the stator winding to provides AC output power more than 2.7 kHz, a stator core which has a plurality of axially extending rectangular slots, and insulators disposed in close contact with the in-slot portion of the wire between parallel walls of slots. The three-phase winding is comprised of a wire having a minimum width equal to or less than 2.6 mm.

9 Claims, 5 Drawing Sheets

STATOR ARRANGEMENT OF VEHICLE AC GENERATOR

CROSS REFERENCE TO RELATED APPLICATION

The present application is based on and claims priority from Japanese Patent Application Hei 11-201064 filed on Jul. 15, 1999, the contents of which are incorporated herein by reference.

BACKGROUND OF THE INVENTION

1. Field of the Invention

The present invention relates to a stator arrangement of a vehicle AC generator for a vehicle.

2. Description of the Related Art

GB 2202170A discloses a stator winding of an AC generator. The stator winding has in-slot portions which has rectangular cross-section to be inserted into slots having parallel walls and circular cross-section at other portions including coil-end portions. This structure is effective to provide a stator winding of a high space factor.

Generally, heat generated in a stator winding operation is conducted to a stator core from slots and to a frame. Therefore, temperature at the stator winding is higher than temperature at the stator core, which is higher than temperature at the frame. Because copper of the stator winding has a 40% higher thermal expansion coefficient than iron of the stator core, the portions inserted into the rectangular slots disclosed in the above patent may receive huge pressure from the walls of the slots due to the difference in thermal coefficient between the stator winding and the stator core, especially while the rotor runs at a high speed at which very high frequencies of the output power is generated. This may break insulators disposed between the stator winding and the stator core, because the stator core is a lamination of press-formed steel plates having burrs.

SUMMARY OF THE INVENTION

A main object of the invention is to provide an improved stator arrangement of a vehicle AC generator.

Another object of the invention is to provide a reliable stator arrangement that can restrain temperature rise at a high speed range of the rotor.

In a vehicle AC generator according to a feature of the invention, a rotor has at least 16 claw pole pieces and is rotatable at a speed where a multi-phase stator winding generates AC output power at a frequency of about 2.7 kHz. The multi-phase stator winding is comprised of a wire having a minimum width equal to or less than 2.6 mm, and insulators and the winding are disposed in close contact to each other between parallel walls of slots.

The winding of above vehicle AC generator preferably has rectangular in-slot portions conforming to the parallel walls of the slots.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator according to a first embodiment of the invention is described with reference to FIGS. 1–6.

Figure 1:
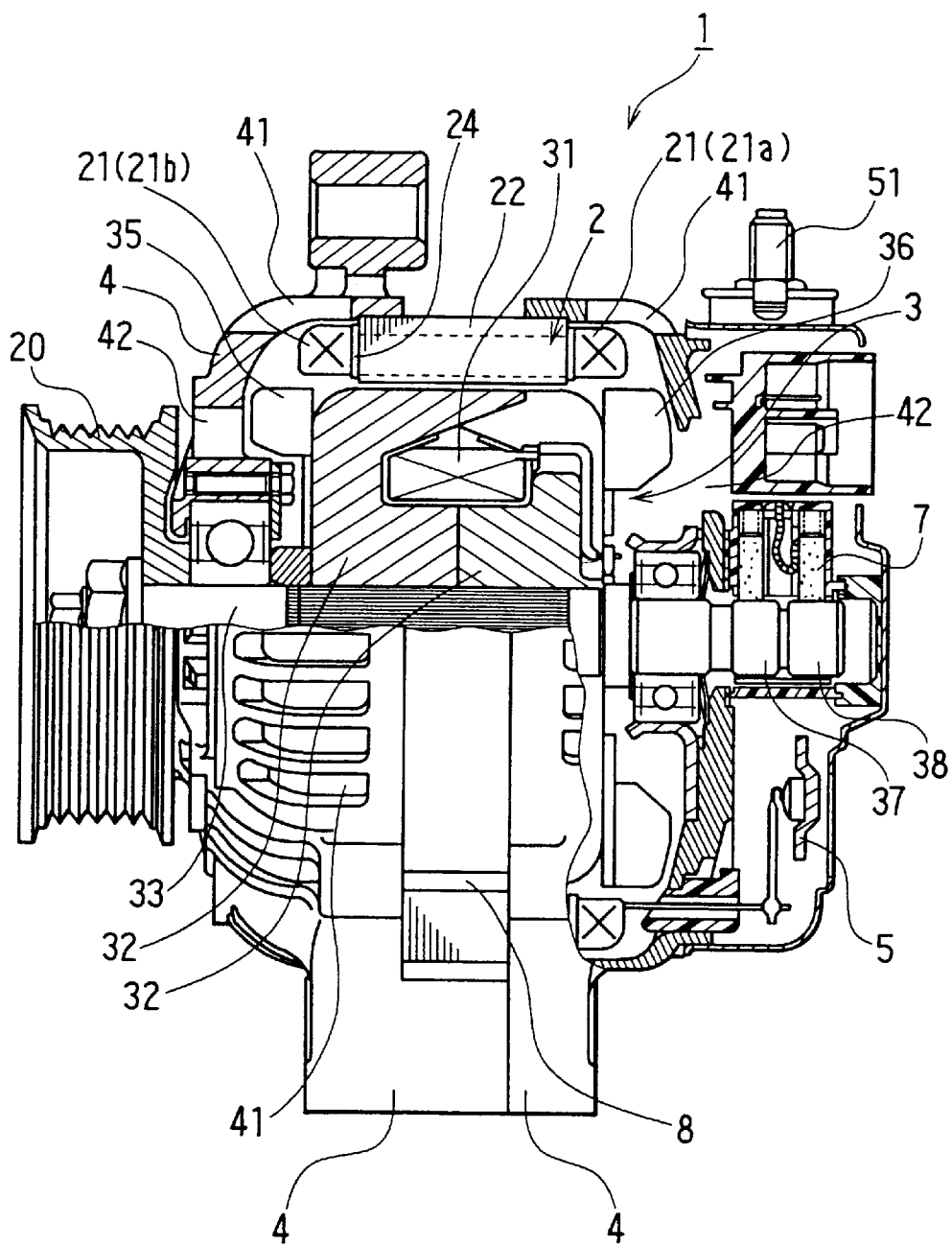
FIG. 1 is a partially cross-sectional side view of an AC generator for a vehicle according to a first embodiment of the invention.

As shown in FIG. 1, vehicle AC generator 1 is comprised of stator 2, 16-pole rotor 3, frame 4 and rectifier unit 5.

Stator 2 is comprised of three-phase stator winding 21, stator core 22, and a plurality of insulators 24 disposed between stator core 22 and stator winding 21.

Rotor 3 is comprised of cylindrically wound field coil 31 and a pair of pole cores 32, shaft 33, mixed-flow-type cooling fan 35, centrifugal cooling fan 36, and a pair of slip rings 37 and 38. The pair of cores 32 is fixed tandem by shaft 33 which is force-fitted into center holes of cores 32. Each core 32 has eight claw poles extending axially to be interleaved with each other, thereby surrounding the field coil 31. Thus rotor 3 has 16 claw pole pieces. Mixed-flow-type cooling fan 35 is welded to the front side of pole cores 32, and centrifugal cooling fan 36 is welded to the rear side of pole cores 32. The pair of slip rings 37 and 38 is carried by rear portion of shaft 33 and connected to field coil 31. Pulley 20 is carried by the front end of shaft 33 to transmit engine torque to rotor 3. Rotor 3 is designed to rotate 20,000 RPM at maximum.

Brush unit 7 is disposed outside the rear frame member to supply field current to field coil 31 through the pair of slip rings 37 and 38.

Frame 4 is comprised of a pair of front and rear frame members, which supports stator 2 and rotor 3 coaxially so that rotor 3 can rotates with shaft 33. Stator core 22 is sandwiched by the pair of frame members and fastened by a plurality of bolts 8 so that the outer periphery of stator core 22 can be exposed to the outside between the pair of frame members. Frame 4 has a plurality of air-discharge windows 41 disposed at portions opposite coil ends 21a and 21b of stator winding 21, and a plurality of air-intake windows 42 at the axial end portions thereof.

If rotor 3 is rotated by the engine torque and field current is supplied to field coil 31, three-phase alternating voltage is induced in stator winding 21, which is converted into DC voltage by rectifier unit 5 and outputed at output terminal 51.

Figure 2:
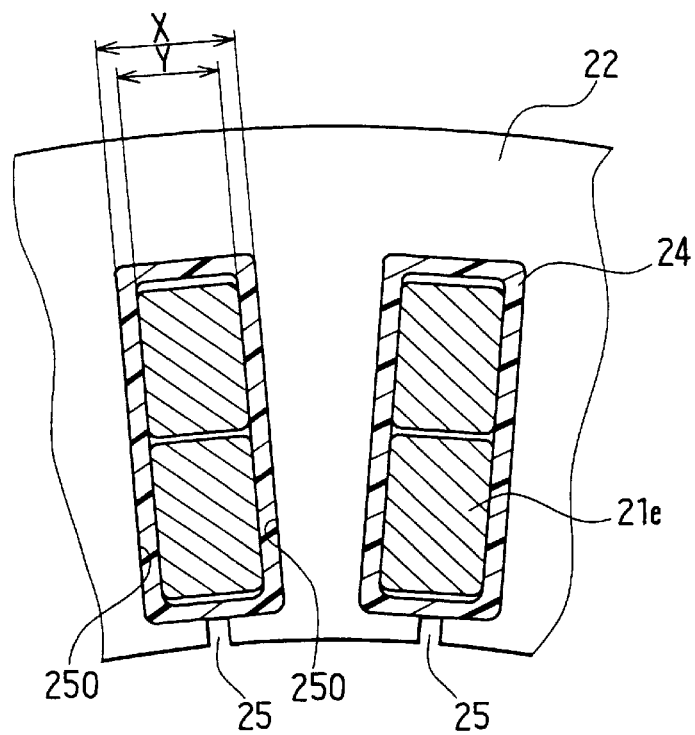
FIG. 2 is a fragmentary schematic cross-sectional view of a stator according to the first embodiment.
Figure 3:
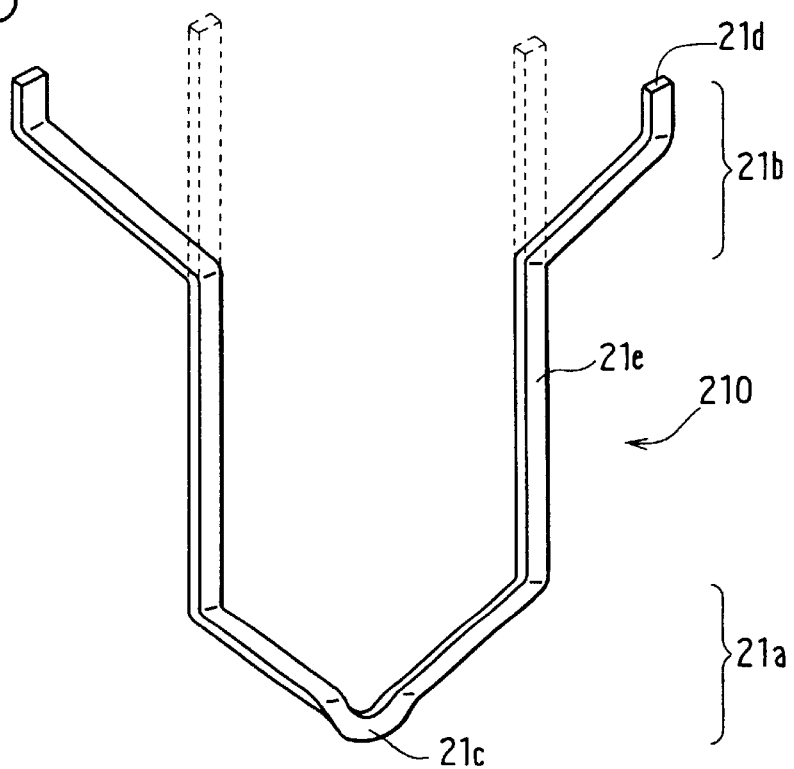
FIG. 3 is a perspective view illustrating a conductor segment forming a stator winding of the stator according to the first embodiment.

Stator core 22 is a lamination of a plurality of iron sheets and has 48 slots 25 formed at the periphery thereof to accommodate in-slot portions 21e of three-phase stator winding 21 with insulators 24, as shown in FIG. 2.

In-slot portion 21e has a rectangular cross-section having the circumferentially opposite sides being in close contact with insulator 24 between the parallel walls of each slot 25.

The circumferential width Y of the rectangular cross section is about 2.6 mm.

As shown in FIG. 1, stator winding 21 has rear-coil-end portions 21a and front-coil-end portions 21b. Stator winding 21 is comprised of a plurality of U-shaped conductor segments 210, each of which has U-turn portion 21c, edge portions 21d and in-slot portion 21e. U-turn portion 21c forms rear-coil-end portion 21a, and edge portions 21d form front-coil-end portion 21b. In-slot portion 21e has a cross-section that conforms rectangular slot configuration, and one insulator 24 and two in-slot portions 21e are tightly inserted into each slot 25 so that in-slot portions 21e are radially aligned in two layers. One edge portion 21d extending from one layer of one slot 25 is connected to another edge portion 21d extending from the other layer of another slot 25 to form stator winding 21.

Figure 4:
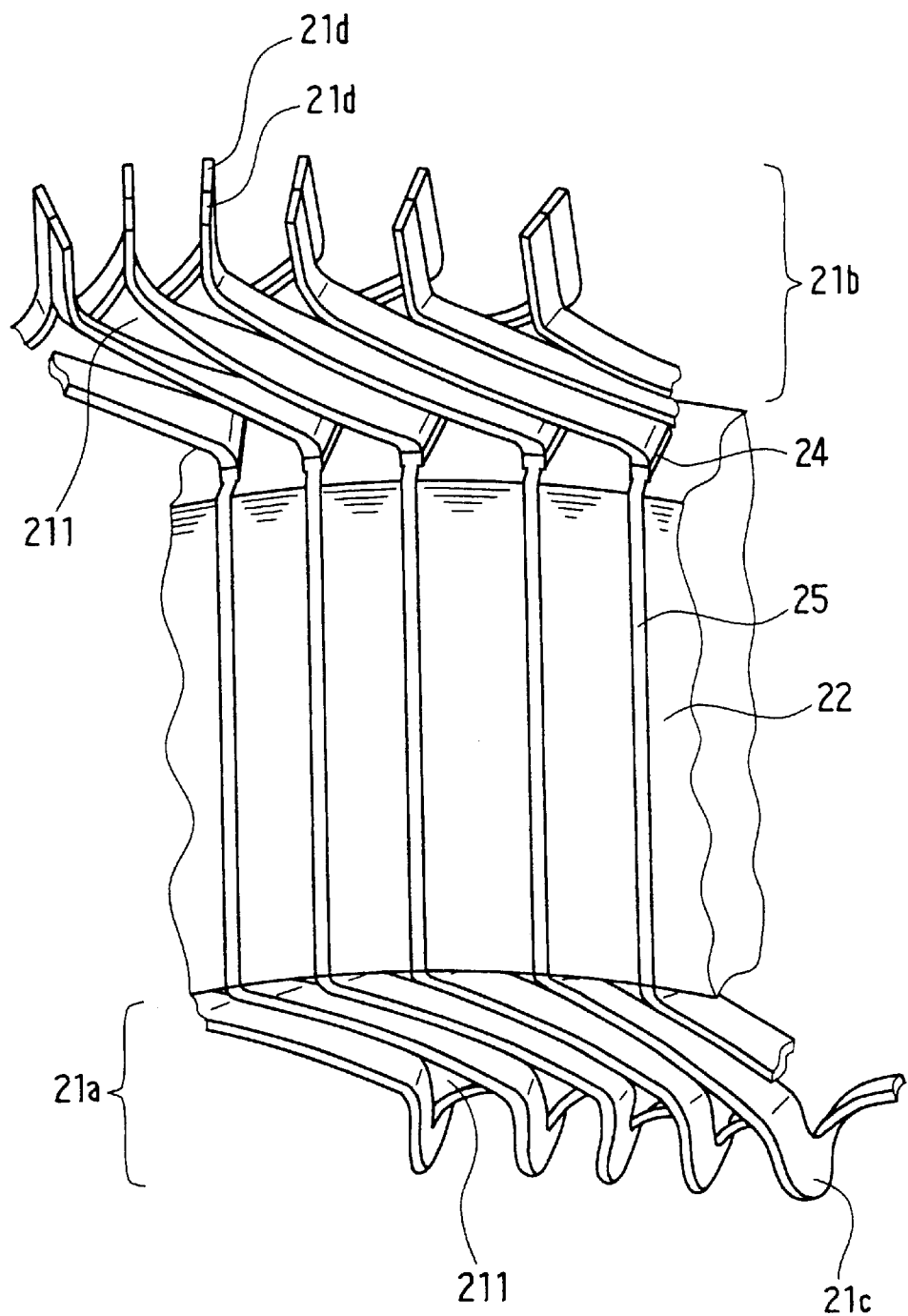
FIG. 4 is a fragmentary schematic perspective view of the stator according to the first embodiment.

As shown in FIG. 4, cooling-air gaps 211 are formed in rear and front coil-end portions 21a and 21b, so that cooling air is taken from air-intake windows 41 to pass through cooling-air-gaps and is discharged from air-discharge windows 41.

Figure 5:
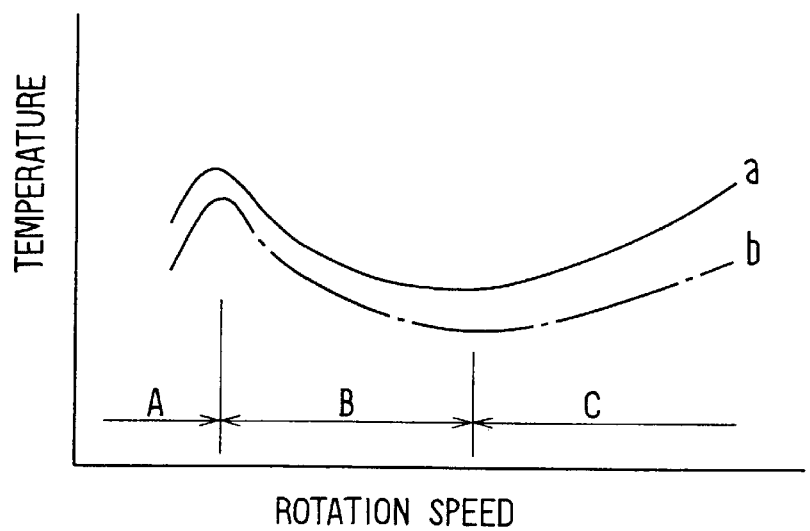
FIG. 5 is a graph showing temperature characteristics of the stator core and the stator winding relative to rotation speed of a rotor.

As shown in FIG. 5, temperature a of stator core 22 and temperature b of stator winding 21 changes as rotation speed changes. The temperature rises sharply in a lower speed range A, because the output power sharply increases while cooling air is not sufficiently supplied to stator winding 21. The temperature gradually lowers in a medium or usual speed range B because the output power does not sharply increase and the cooling air is supplied sufficiently. The temperature rises gradually in a higher speed range C because eddy current loss of stator core 22 increases as the frequency of the magnetic flux change increases, and because resistance of stator winding 21 increases due to a skin effect.

Figure 6:
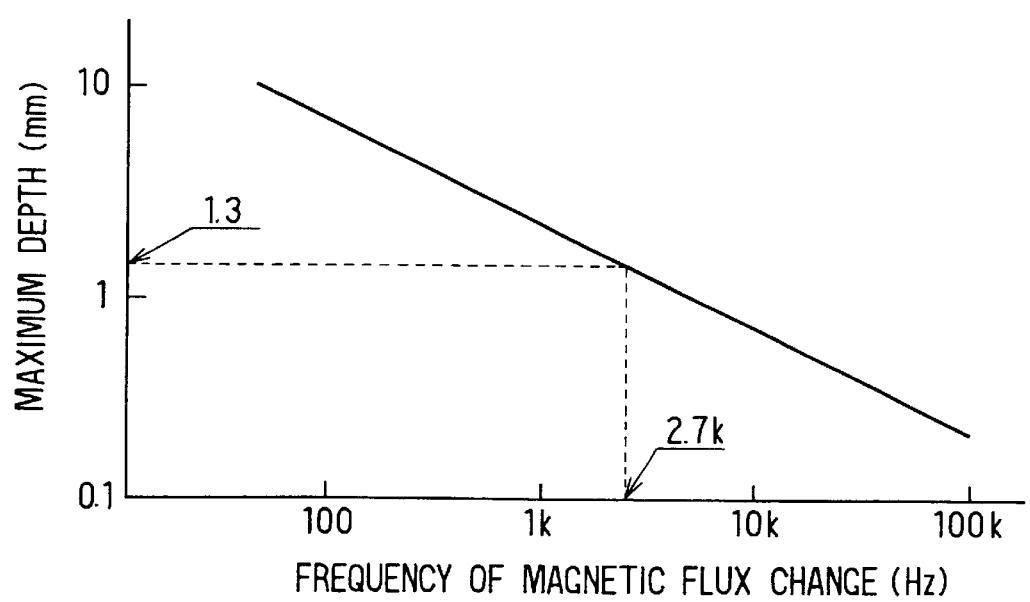
FIG. 6 is a graph showing relationship between depths of effective conducting area and frequencies of current flowing through the conducting area.

In order to prevent a substantial temperature rise due to a skin effect, the cross section of stator winding should be designed properly, taking a depth of the skin effect into account. As shown in FIG. 6, it has been found that the maximum depth of the skin effect of stator winding 21 is about 1.3 mm. The depth is decided according to the frequency, about 2.7 kHz, of the magnetic flux change at the maximum rotation speed of rotor 3, 20,000 RPM. That is, $f = n \cdot p / 120 = 20{,}000 \times 16 / 120 \approx 2.7$ kHz. This result indicates that each conductor segment 210 of stator winding 21 having more than 2.6 mm in circumferential width is not effective to reduce the resistance thereof. In other words, it is preferable for stator winding 21 to have conductor segments 210 having the circumferential width of about 2.6 mm or less. If the output power increases, the number of conductor segments 210 in each slot should be increased while the circumferential width is limited to be less than 2.6 mm.

Thus, the temperature rise due to the skin effect can be restrained, so that the pressure applied on insulators 250 can be moderated. This prevents insulators 250 from being damaged.

(Second Embodiment)

Figure 7:
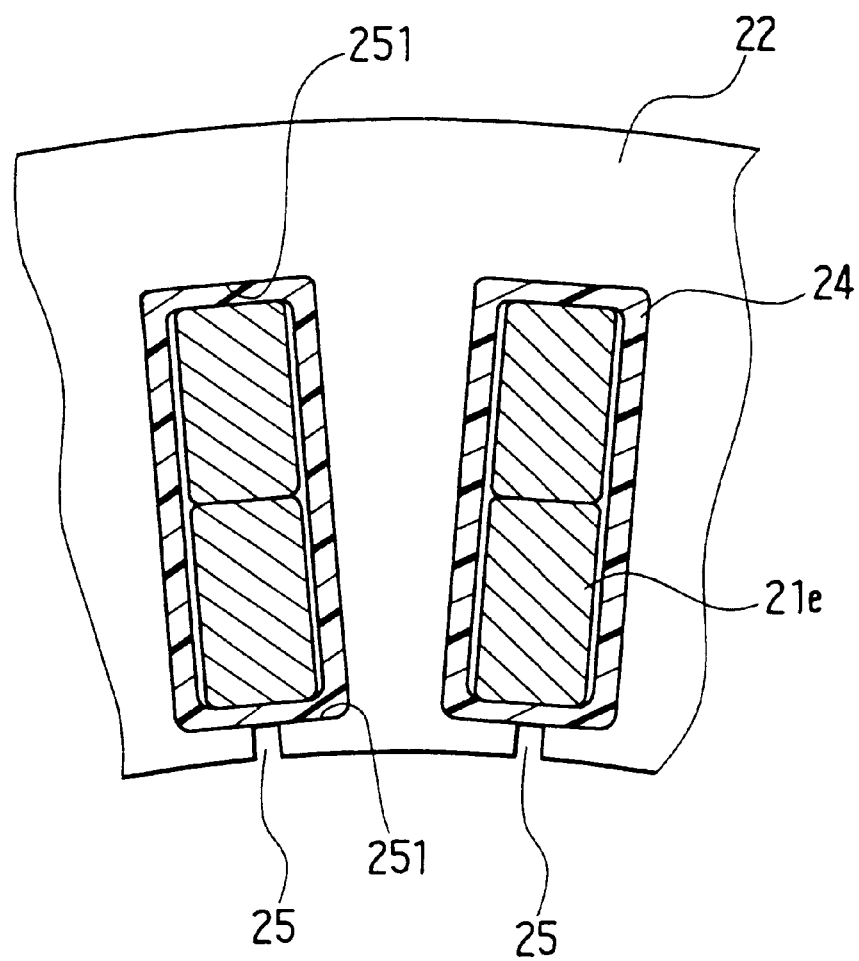
FIG. 7 is a fragmentary schematic cross-sectional view of a stator according to a second embodiment of the invention.

As shown in FIG. 7, in-slot portion 21e has a rectangular cross-section having the radially opposite sides being in close contact with insulator 24 between the radially opposite walls of each slot 25. The circumferential width of the rectangular cross section is about 2.6 mm and less than the distance between the circumferentially opposite inner sides of insulator 24.

The number of in-slot portions in each slot can be changed to maintain the shorter sides of the rectangular cross section of the in-slot portion to be equal to or shorter than 2.6 mm.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A vehicle AC generator including a rotor providing a magnetic field, a stator having a stator core, a multi-phase stator winding having coil ends disposed at opposite ends of said stator core with insulators thereof disposed in said stator core, and a frame for supporting said rotor and stator, wherein said rotor has at least 16 claw pole pieces and is rotatable at about 20,000 rpm to generate output power at a frequency as high as about 2.7 kHz, said stator core has a plurality of axially extending rectangular slots, said stator winding comprises a wire having a width equal to or less than 2.6 mm, said insulators abut said winding in a circumferential direction between parallel walls of said slots and a gap exists between said insulators and said winding in a radial direction;

said frame has a plurality of air-intake windows and air-discharge windows, and said air-discharge windows are disposed opposite said coil ends, and said rotor has a cooling fan for blowing on said coil ends; wherein a speed of said rotor determines a frequency of a magnetic flux change which determines a depth of a skin effect of a conductor segment;

said speed of said rotor causes a temperature change of said stator core and said stator winding;

a temperature of the stator core changes as eddy current losses increase in said stator core as said frequency of said magnetic flux changes; and said wires are formed so as to permit passage of air between said wires to permit cooling of said wires.

2. The vehicle AC generator as claimed in claim 1, wherein said winding has rectangular in-slot portions conforming to said parallel walls of said slots.

3. The vehicle AC generator of claim 1, wherein a maximum skin effect depth of a stator winding wire is approximately 1.3 mm at said rotor rotation speed of 20,000 rpm at about said 2.7 kHz of said magnetic flux change.

4. A vehicle AC generator having a rotor with at least 16 claw pole pieces, the generator further comprising:

a stator having a stator core, wherein said stator core has a plurality of axially extending rectangular slots;

a multi-phase stator winding having coil ends disposed at opposite ends of said stator core, wherein said winding comprises a wire;

a plurality of insulators disposed between said stator core and said wire of said winding, wherein said insulators abut said winding in a circumferential direction between parallel walls of said slots and a first gap exists between said insulators and said winding in a radial direction; and a frame forming a second gap, said frame for supporting a rotor and said stator, wherein, at an outer periphery of said stator core, said second gap exposes said stator core to an outside, and a speed of said rotor determines a frequency of a magnetic flux change which determines a depth of a skin effect of a conductor segment, said speed of said rotor causes a temperature change of said stator core and said stator winding, and a temperature of the stator core changes as eddy current losses increase in said stator core as said frequency of said magnetic flux changes.

5. The vehicle AC generator of claim 4, wherein said wire has a width equal to or less than 2.6 mm.

6. The vehicle AC generator of claim 4, wherein said frame has a plurality of air-intake windows and air-discharge windows, and said air-discharge windows are disposed opposite said coil ends, and said rotor has a cooling fan for blowing on said coil ends.

7. The vehicle AC generator of claim 4, wherein a temperature rise due to said skin effect can be restrained, so that the pressure applied on said insulators can be moderated.

8. The vehicle AC generator of claim 4, wherein a conductor segment width of said stator winding is approximately 2.6 mm or less.

9. A vehicle AC generator including a rotor providing a magnetic field, a stator having a stator core, a multi-phase stator winding having coil ends disposed at opposite ends of said stator core with insulators thereof disposed in said stator core, and a frame for supporting said rotor and stator, wherein said rotor has at least 16 claw pole pieces and is rotatable at about 20,000 rpm to generate output power at a frequency as high as about 2.7 kHz, said stator core has a plurality of axially extending rectangular slots, said stator winding comprises a wire having a width equal to or less than 2.6 mm, said insulators and said winding are disposed in close contact to each other between parallel walls of said slots, said frame has a plurality of air-intake windows and air-discharge windows, and said air-discharge windows are disposed opposite said coil ends, and said rotor has a cooling fan for blowing on said coil ends, wherein a speed of said rotor determines a frequency of a magnetic flux change which determines a depth of a skin effect of a conductor segment;

said speed of said rotor causes a change in temperature of said stator core and said stator winding;

a temperature of the stator core changes as eddy current losses increase in said stator core as said frequency of said magnetic flux changes; and wherein said wires are formed so as to permit passage or air between said wires and said insulators in a circumferential direction to permit cooling of said wires and said wires abut each other in a radial direction.

* * * * *